United States Patent
Maillet et al.

(10) Patent No.: US 9,777,673 B2
(45) Date of Patent: Oct. 3, 2017

(54) ALTERNATIVE METHOD FOR DISMANTLING SOLID-PROPELLANT MOTORS

(75) Inventors: Didier Maillet, Saint Medard en Jalles (FR); Christophe Douais, Saint Medard en Jalles (FR); Nicolas Rumeau, Saint Medard en Jalles (FR); Dominique Leveque, Saint Medard en Jalles (FR)

(73) Assignee: ROXEL FRANCE, St Medard en Jalles (FR)

( * ) Notice: Subject to any disclaimer, the term of this patent is extended or adjusted under 35 U.S.C. 154(b) by 722 days.

(21) Appl. No.: 14/126,834

(22) PCT Filed: May 4, 2012

(86) PCT No.: PCT/EP2012/058293
§ 371 (c)(1),
(2), (4) Date: Apr. 17, 2014

(87) PCT Pub. No.: WO2012/171718
PCT Pub. Date: Dec. 20, 2012

(65) Prior Publication Data
US 2015/0013158 A1   Jan. 15, 2015

(30) Foreign Application Priority Data
Jun. 15, 2011 (FR) .................................. 11 55213

(51) Int. Cl.
*F42B 33/06* (2006.01)
*F02K 9/32* (2006.01)

(52) U.S. Cl.
CPC .............. *F02K 9/32* (2013.01); *F42B 33/067* (2013.01); *Y10T 29/49229* (2015.01)

(58) Field of Classification Search
CPC ......... Y10T 29/49238; Y10T 29/49233; Y10T 29/49229; F02K 9/32; F42B 33/067; F42B 33/06
See application file for complete search history.

(56) References Cited

U.S. PATENT DOCUMENTS 5,025,632 A   6/1991  Spritzer
5,220,107 A   6/1993  Kubacki
(Continued)

FOREIGN PATENT DOCUMENTS

FR   2824901 A1   11/2002
FR   2857357 A1   1/2005
(Continued)

OTHER PUBLICATIONS

Search Report dated Jul. 27, 2012 from International Patent Application No. PCT/EP2012/058293.

*Primary Examiner* — Sarang Afzali
*Assistant Examiner* — Ruth G Hidalgo-Hernandez
(74) *Attorney, Agent, or Firm* — Baker & Hostetler LLP (57) ABSTRACT

A method is provided for solid-propellant engines to be dismantled safely and in accordance with environmental standards having been scrapped. For each engine to be dismantled, it is mounted on a static test rig, immersed in a tank filled with water and started such that propellant is used up under the water. The soluble part of the combustion products (gases or condensates) thus remains trapped in the water in the tank while the non-soluble solid products drop to the bottom of the tank. The body of the engine emptied of its fuel in this way and rendered pyrotechnically inert is then taken apart or disassembled. Periodically, the water in the tank is withdrawn and the tank stripped of its deposits such that subsequent dismantling operations can be carried out under proper conditions. All of the combustion products (Continued)

recovered are sent to appropriate reprocessing plants. The method allows high dismantling rates.

7 Claims, 5 Drawing Sheets (56) References Cited

U.S. PATENT DOCUMENTS

| | | | | |
|---|---|---|---|---|
| 5,458,071 | A | * | 10/1995 | Tadmor .................. F23G 7/003 110/237 |
| 5,552,093 | A | | 9/1996 | Lee |
| 5,574,203 | A | * | 11/1996 | Noel .................. C06B 21/0091 110/237 |
| 2004/0107824 | A1 | | 6/2004 | Ferrari et al. |
| 2007/0161844 | A1 | | 7/2007 | Gaudre et al. |

FOREIGN PATENT DOCUMENTS

| | | |
|---|---|---|
| GB | 2267955 A | 12/1993 |
| WO | 2011021969 A1 | 2/2011 |

* cited by examiner

ALTERNATIVE METHOD FOR DISMANTLING SOLID-PROPELLANT MOTORS

CROSS-REFERENCE TO RELATED APPLICATIONS

This application is a National Stage of International patent application PCT/EP2012/058293, filed on May 4, 2012, which claims priority to foreign French patent application No. FR 1155213, filed on Jun. 15, 2011, the disclosures of which are incorporated by reference in their entirety.

FIELD OF THE INVENTION

The invention relates to the field of dismantling mainly solid-propellant engines, in particular motors installed in powered vehicles that have reached the end of their operational life and have to be withdrawn from theaters of operation and storage capacities. The invention also covers the field of activity consisting in simple engine replacements in powered vehicles.

It relates in particular to the field of means for dismantling such engines at a high dismantling rate, respecting elementary safety rules and rules relating to environmental protection.

BACKGROUND

A solid-propellant engine generally consists of a cylindrical outer body, more commonly known as an engine body, which is blind or open at its two ends, within which connecting materials, thermal protection and liner, for keeping the solid propellant in place within the body are disposed. The solid propellant forms the material which, when combusted, generates gases, the ejection of which through the nozzle is responsible for propelling the vehicle in which the engine is integrated.

Figure 1:
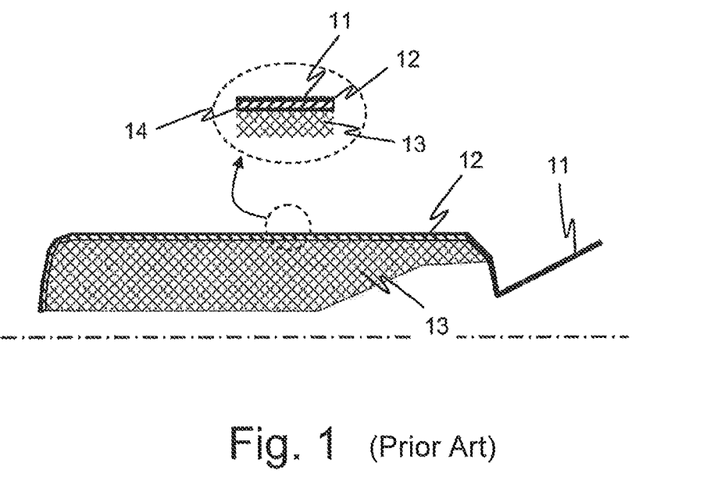
FIG. 1 schematically shows an engine body with fuel having a "cast-bonded" structure.
Figure 2:
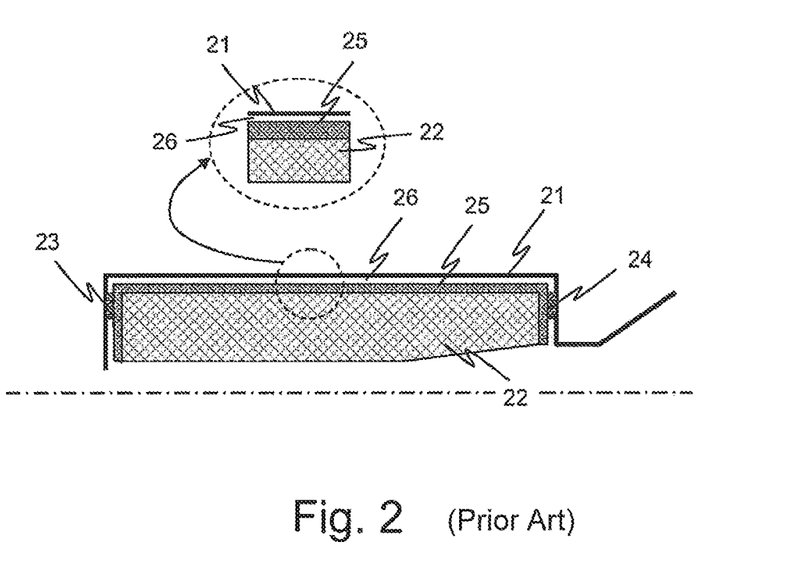
FIG. 2 schematically shows an engine body with fuel having a "free" structure.

As is known, in a solid-propellant engine as described above, the fuel may have two different designs, one being known as "cast-bonded", illustrated in FIG. 1, in which the propellant 13 is secured to the body of the engine 11 and to its thermal protection coating 12 by way of structural connections brought about by the liner 14, the other being known as "free", illustrated in FIG. 2, in which the propellant charge 22, previously crosslinked and inhibited, is kept in place within the engine body 21 by spacers 23 and 24 that define a gap 26.

The dismantling of a solid-propellant engine, that is to say its final removal from service, generally consists in reducing it to a configuration such that the function for which it was designed, namely propulsion, and thus the combustion of the propellant, can no longer be carried out. The main reason for dismantling is safety of property, and particularly of personnel, that may be in the vicinity of this engine even after it has been scrapped.

The dismantling procedure adopted, and also the means employed, generally meet various requirements, such as the simplicity of the operations carried out, or the guarantee of pyrotechnic safety (non-propagation of effects). They must also be in line with the dismantling rates imposed, that is to say with the quantity of engines to be processed during a given period of time.

The prior art proposes a number of dismantling methods which, however, are not able to meet the stringent requirements in terms of processing rates or in terms of simplicity of implementation. Simplicity of implementation is understood to mean in particular the absence of an operation of cutting the engine body or of emptying the propellant by any method.

The U.S. Pat. No. 5,220,107 granted to the company United Technologies Corporation on Jun. 15, 1993 refers in particular to the fragmentation of a bare propellant charge, by cooling the charge to a very low temperature and using a crusher or a press to fragment it.

The U.S. Pat. No. 5,025,632 granted to the company General Atomic on Jun. 25, 1991 proposes extracting the propellant from a cast-bonded engine having a central channel by means of a jet of cryogenic liquid. Such a method, derived from the principle of a hydraulic knife, is known to create non-negligible industrial cycle times and is thus incompatible with high dismantling rates.

The U.S. Pat. No. 5,552,093 granted to David E. Lee on Sep. 3, 1996 for its part claims a method for extracting propellant from an engine having a cast-bonded design, said method consisting in fully immersing the engine body in liquid nitrogen, while the charge is fragmented by application of repeated impacts. In addition to being expensive, such a method can also not be considered satisfactory from the point of view of pyrotechnic safety, the damaged propellant (which is cracked for example) generally having increased sensitivity to some attacks of the impact type.

The patent FR 03 08474 granted to the company SNPE Matériaux Energétiques on Aug. 19, 2005 describes a dismantling method based on successively carrying out steps consisting in the cutting of sections of engines and the cryogenic emptying of the propellant contained in each section, the fragments of propellant being subjected, after a possible crushing operation, to a final processing operation consisting of biological processing of the perchlorate residues that form the (dissolved) liquid effluents, these residues having previously been freed of (non-soluble) organic and metallic species that enter the composition of a composite propellant.

However, such a method has a lengthy cycle time. It also forms a costly solution since it makes use of numerous cutting and emptying operations. It is furthermore relatively complex to implement, since it makes use, for the recycling of the propellant, of technology employing living organisms (population of bacteria), the activity of which affects the processing efficacy. On account of its biological nature (use of living organisms), it is also very difficult to control, and this can lead to significant constraints in the scope of high dismantling rates.

Such a method employing processing of the biological type furthermore has use limitations since, to date, it is only suitable for processing water-soluble chemical compounds such as ammonium perchlorate, an oxidizing charge mainly employed in the production of composite propellants. Consequently, it cannot be employed to dismantle conventional (solventless and cast) "double base" solid propellants or advanced propellants such as XLDB, NEPE Azorgols. In particular, it does not satisfy the problem of dismantling tactical missile engines, most of which, for reasons of discretion, incorporate homogeneous propellant technologies.

SUMMARY OF THE INVENTION

One aim of the invention consists in proposing an alternative dismantling method which is compatible with as many possible types of solid-propellant engines that are used, in particular those employed in the field of tactical missiles, and allows the dismantling operations to be simplified and the period of time necessary for this dismantling to be shortened.

To this end, the subject of the invention is a method for dismantling solid fuel engines, the method consisting, for each engine to be dismantled, in starting the engine so as to use up all of the propellant that it contains, then in taking apart the actual structure of the engine body. According to an essential feature of the invention, the engine is started and the propellant is combusted while the engine is mounted on a static test rig and immersed in a tank filled with water.

In a preferred embodiment, the method according to the invention repetitively implements a main sequence having the following steps:

A first step which consists in mounting an engine (41) on a static test rig that holds the engine in a fixed position;

A second step during which the static test rig, equipped with the engine to be dismantled, is immersed at the bottom of a tank filled with water;

A third step of turning on the engine, during which the propellant is used up at the bottom of the tank;

A fourth step which consists, after complete combustion of the propellant, in removing the static test rig from the water and dismounting the engine from the test rig;

A fifth step which consists in rinsing the body of the engine so as to extract the solid combustion residues which still adhere to the internal walls of the body of the engine;

A sixth step which consists in taking apart the body of the engine emptied of propellant.

According to a particular embodiment, in which the test bank used is able to accommodate a number of engines, it repetitively implements a main sequence having the following steps:

A first step which consists in mounting engines on the static test rig;

A second step during which the static test rig, equipped with the engines to be dismantled, is immersed at the bottom of a tank filled with water;

A third step of starting the engines, the engines being started simultaneously or one after another;

A fourth step which consists, after all of the engines mounted on the static test rig have been started, in removing the static test rig from the water and dismounting the engines from the test rig;

A fifth step which consists in rinsing the body of each engine in order to extract the solid combustion residues which may still adhere thereto;

A sixth step which consists in taking apart the bodies of the engines emptied of propellant.

According to another particular embodiment, the method according to the invention uses a static test rig having a barrel-type device for accommodating a plurality of motors and for sequentially starting the motors mounted on the rig.

In a preferred embodiment, the method according to the invention carries out the main dismantling sequence repetitively so as to dismantle all of the engines for which dismantling is required. Each operation of carrying out the main sequence is followed by a test which consists in determining whether the content of combustion products in the water in the immersion tank and the quantity of insoluble combustion products located at the bottom of the immersion tank allow a new dismantling sequence to be carried out.

In a particular form of the preceding embodiment, if the test is negative, a step of recovering and screening insoluble products located at the bottom of the immersion tank and also a step of carrying out a purification treatment of the water in this tank are carried out.

In a particular form of the preceding embodiment, the step of recovering and screening insoluble products is followed by operations of recycling these products and the step of carrying out a purification treatment of the water in the immersion tank is followed by an operation of recycling the products in solution.

In a particular embodiment of the method according to the invention, which is suitable for the case in which the immersion tank is connected to air suction means located above the free surface of the water in the tank, the step of starting the engines also involves starting the suction means, these means being stopped after the operation of the last engine is stopped during this step.

The invention thus consists in the development of an alternative method, this method being the result of experience accumulated in the characterization, on a static test rig immersed in a pool, of solid-propellant engines intended for the propulsion of underwater cruise missile devices.

Advantageously the alternative method presented in the rest of the text makes it possible to obtain a high daily processing rate. It also has the following features:

the absence of sensitive operations from a point of view of pyrotechnic safety: the method does not in particular have, prior to processing, operations such as the removal of igniters and nozzles or operations of cutting sections of engines and emptying propellant, the engine being destroyed in a configuration identical to that in which it is delivered by the original owner, following operations of detaching the ammunition (withdrawal of the warhead), control of the effects of poorly controlled combustion (thermal effects, fragments etc.) in the event of unexpected pyrotechnic events, compatibility with cast-bonded charge designs and with free charge designs, compatibility with a very wide range of energy materials (solid propellants) corresponding to the various designs of engines to be dismantled, materials used notably in the field of defense, the range extending from (solventless, cast) double base propellants to composite propellants (butargols, isorgols) and to new generation propellants (XLDB, NEPE, Azorgol), limitation, or even complete elimination, of the acoustic disturbances of firings in the atmosphere (annihilation of excess air pressures), limitation, or even complete elimination, of atmospheric pollution (emission of NOx and acidic gaseous species such as hydrochloric acid for example) caused by the phases of destruction by burning in the atmosphere, reuse of the inert elements of the engine (metal or composite engine bodies etc.) by means of identified recycling plants (return to the foundry for metals, recycling of carbon and Kevlar fibers etc.).

BRIEF DESCRIPTION OF THE DRAWINGS

The features and advantages of the invention will be clearly presented in the following description which is given with reference to the appended figures, in which.

DETAILED DESCRIPTION

From a general technical point of view, the method according to the invention consists in putting the engine to be dismantled into operation in an appropriate medium, an aquatic medium in this case, until the propellant has been fully combusted. The efficacy of the method according to the invention lies mainly in the residence time, in an aqueous medium, of the combustion products released by the engine during its operation, the residence time of the combustion products in water being mainly dependent on the depth of the tank in which the engine is sitting. The desired aim here is to be able to contain, within this structure enclosing the mass of water in which combustion takes place, a tank-type structure for example, the majority of the gaseous chemical species (hydrochloric acid for example), liquid chemical species and solid chemical species (organometallic salts etc.) generated by the combustion of the propellant, these combustion products being retained by various physico-chemical and thermodynamic mechanisms such as dissolution mechanisms, condensation mechanisms or quenching mechanisms.

Figure 3:
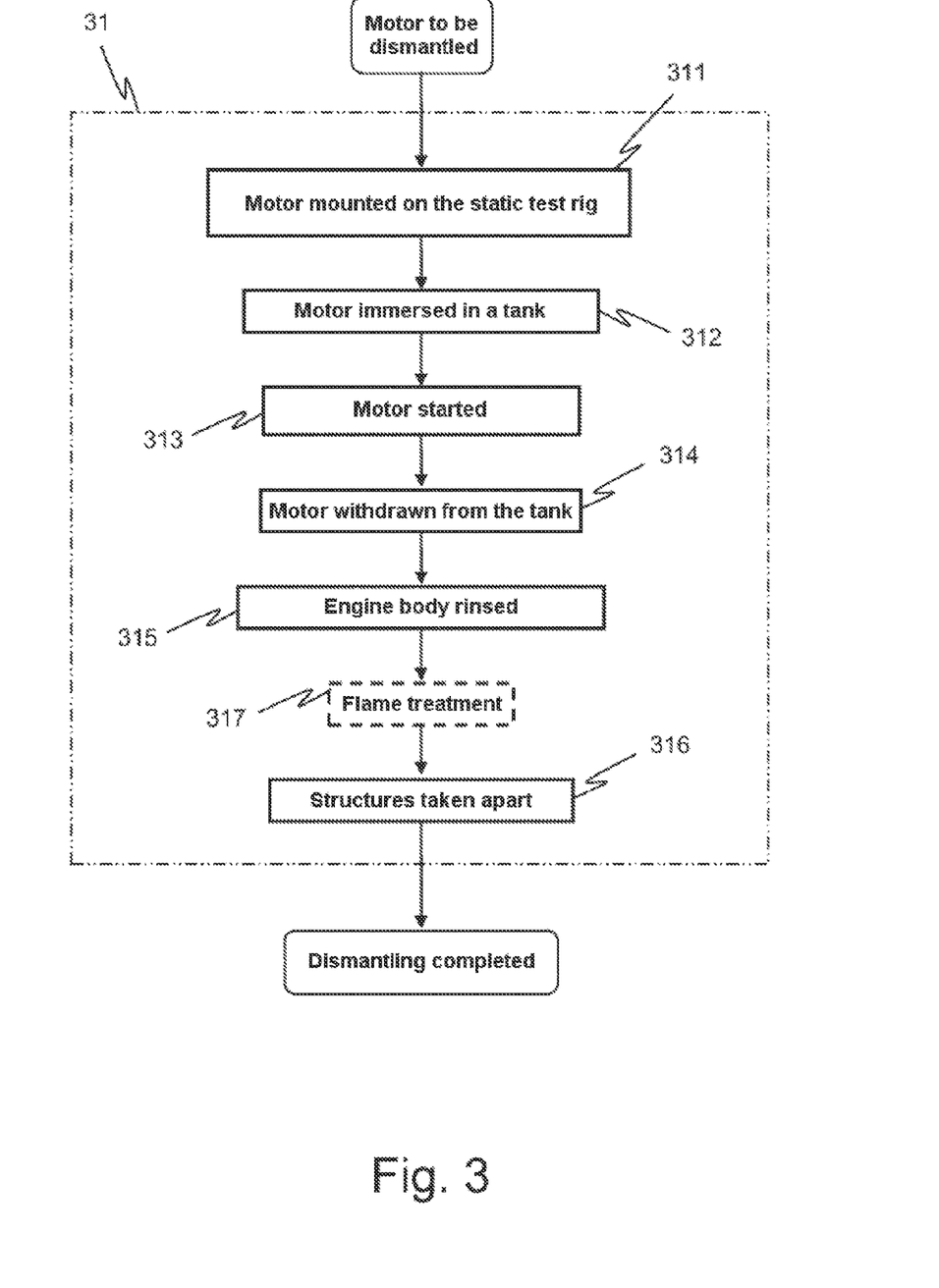
FIG. 3 shows a schematic flowchart of the steps in the main sequence of the method according to the invention.

The method according to the invention implements successive dismantling sequences 31. As illustrated in FIG. 3, a sequence has, for each engine to be dismantled, the following main steps:

A first step 311 which consists, with the engine disconnected from the rest of the vehicle, in mounting this engine, equipped with its igniter and its nozzle, on a static test rig, a thrust test rig for example, so as to keep the engine in a fixed position during the operation phase;

A second step 312 during which the rig equipped with the engine to be dismantled is immersed at the bottom of a tank filled with water (immersion tank);

A third step 313 of turning on the engine, during which phase the propellant is used up at the bottom of the tank;

A fourth step 314 which consists, after complete combustion of the propellant, in removing the engine from the water and dismounting it from the test rig;

A fifth step 315 which consists in rinsing the body of the engine in order to extract therefrom the liquid species and also the solid combustion residues which still adhere to the internal walls of the engine;

A sixth step 316 which consists in taking apart the engine body emptied of propellant.

Depending on the dismantling rate imposed, the various steps can be implemented in different ways and employing various means.

Figure 4:
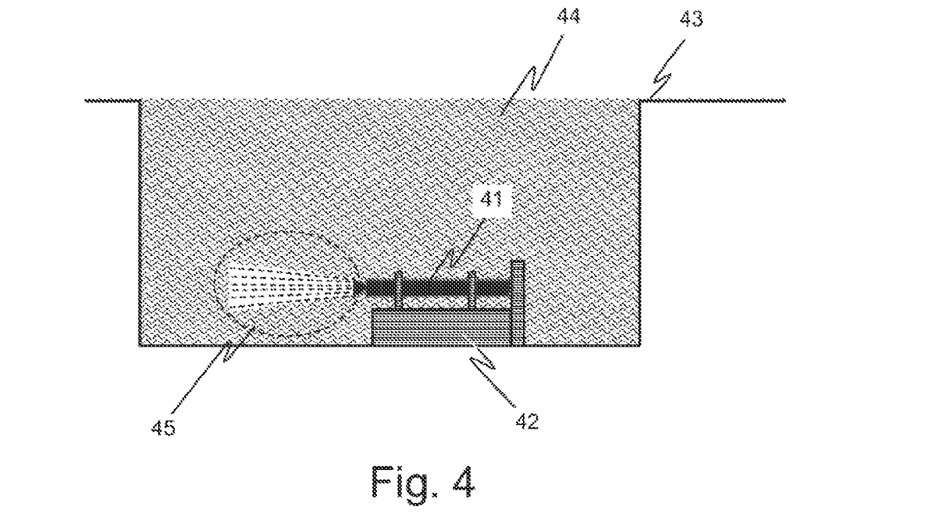
FIGS. 4 and 5 show schematic illustrations of the main installations necessary for implementing the method, according to two variant embodiments.

Thus, in a simple embodiment, illustrated in FIG. 4, the method according to the invention ensures that for each sequence a single engine 41 is dismantled at a time. To this end, it employs a simple support structure 42 that makes it possible to keep one engine at a time immersed in a tank 43 containing an appropriate volume of water 44 and to fire said engine, such that, for each engine, the dismantling operation involves a step 312 of immersing the engine 41 and the support structure 42 followed by a step 314 of lifting up the assembly following combustion of the charge of propellant.

Figure 5:
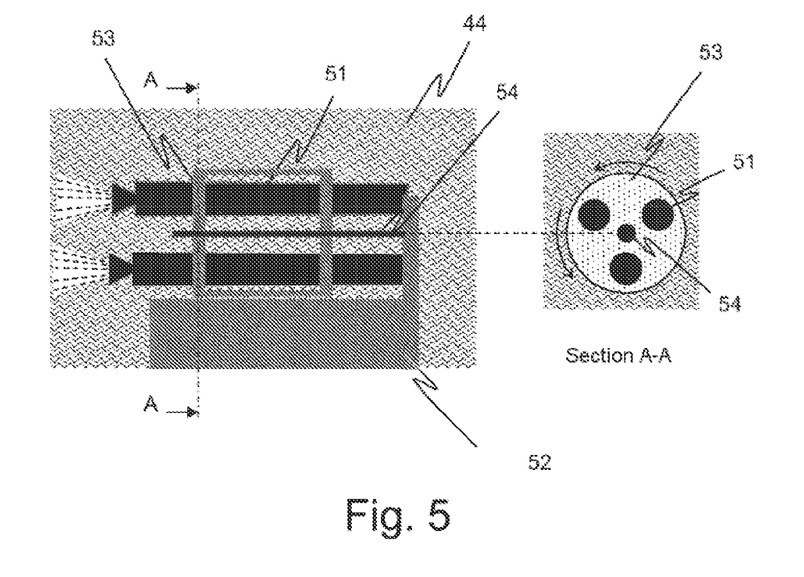

Alternatively, if the dismantling campaign requires a high rate on account of the urgency of this dismantling or the number of engines to be dismantled for example, the method according the invention may be implemented, as illustrated in FIG. 5, such that a plurality of engines are dismantled in each sequence 31, using notably an appropriate support structure that makes it possible to immerse a plurality of engines simultaneously and to sequentially fire each of the engines 51, or more simply to simultaneously fire (salvo) all of the engines mounted on this structure. Such a configuration thus advantageously avoids having to carry out the immersion step 312 and lifting up step 314 for each of the dismantled engines 51, thereby making possible to accelerate the dismantling rate.

In the case of sequential firing, as illustrated in FIG. 5, this support structure consists for example of a rigid support 52 on which there is mounted a device 53 of the "barrel" type that is able to accommodate a plurality of engines and is able to rotate about an axis 54 aligned with the axis of the engines 51. It also has a motor (not shown in FIG. 5) for turning the barrel 53 so as to position the engine to be actuated in the position provided for starting it, in the bottom position for example.

In the case of simultaneous firing of all of the motors mounted on the support (salvo), on the other hand, the structure may consist of a support 52 that is able to withstand the stresses exerted by a plurality of engines operating simultaneously.

In order to carry out optimal dismantling in terms of the recovery of the combustion products, the method according to the invention requires the installation of a tank 43 filled with water, the volume 44, and in particular the depth, of which depends on the discharge flow of the products evacuated during the combustion of the propellant contained in an engine.

From a practical point of view, the depth of the tank 43 and its associated volume of water 44 should be sufficient, taking the dimensions of the discharge cone 45 of the combustion products into account, to at least limit as far as possible, if not completely prevent, the combustion products from rising to the surface. The depth of the tank 43 should in particular be sufficient to ensure an optimal residence time for the species generated by the combustion so as to promote the dissolution in the water of all of the materials and all of the gases that are soluble in water. It should also be sufficient to slow down the movement of the insoluble combustion products (in particular solid particles) and cause them, by way of a settling phenomenon, to remain trapped at the bottom of the tank.

In an identical aim of optimizing the recovery of the combustion products, the step 315 of rinsing each engine following combustion of its propellant charge preferably employs washing means for recovering the combustion residues obtained or dissolved by washing from the wall of the engine.

According to the invention, the sixth step 316 of a sequence may, if necessary, be preceded by an optional supplementary step 317 that consists in exposing the dismounted engine bodies to a flame so as to clean any combustion material residues from the wall elements of the engine and to guarantee the complete decontamination (in the pyrotechnic sense) of the structures, metal structures in particular, before storing them and then sending them for recycling at identified plants.

From an operational point of view, a phase of dismantling a stock of solid-propellant engines consists in implementing the dismantling sequence 31 as many times as is necessary to dismantle all of the stock. Consequently, the method according to the invention consists mainly in carrying out a plurality of iterations of the sequence 31. However, since the volume of water contained in the tank is charged progressively with dissolved combustion products and the bottom of the tank is charged with insoluble elements, it is necessary, after a certain number of iterations, to clean the bottom of the tank and to recondition the water contained therein.

Figure 6:
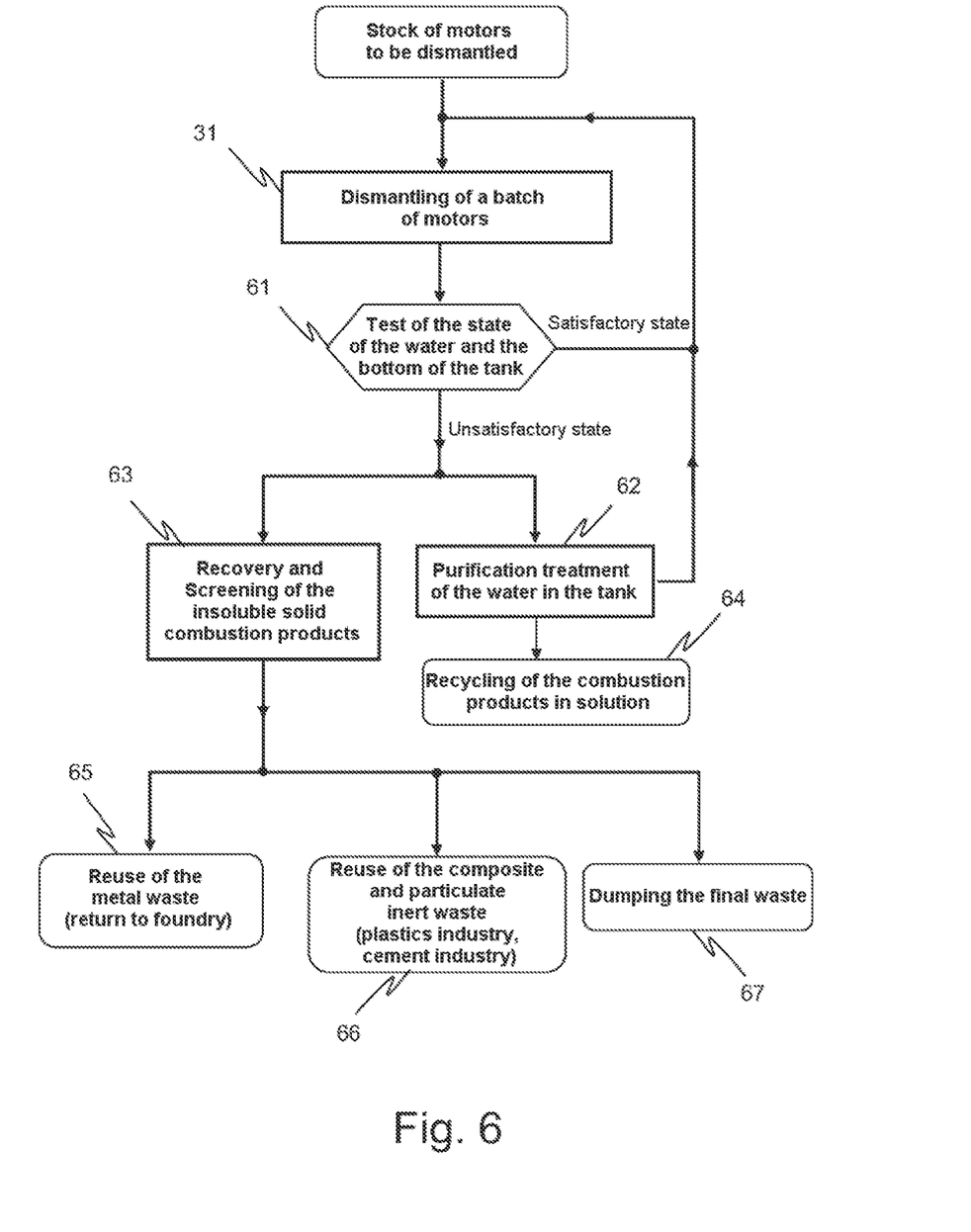
FIG. 6 shows a schematic flowchart of the entire method according to the invention, demonstrating its advantages.

For this reason, the method according to the invention may be described, as illustrated in FIG. 6, as an alternation of groups of sequences 31, each group being separated from the following by a step 61 of checking the content of dissolved chemical compounds in the water in the tank and the quantity of solid residues present at the bottom of the tank. Depending on the result of the check, a group of dismantling sequences 31 may be followed by the following group or separated therefrom by a maintenance operation involving a number of operations:

an operation 62 of processing (regenerating) the water contained in the tank, regeneration having the function of recovering the elements dissolved in the water during successive dismantling sequences 31. The operation 62 consists mainly in stabilizing (pH neutralization of the buffering type) the water in the immersion tank 43. As illustrated by the example of infrastructure in FIG. 7, this operation can be carried out by means of caustic soda delivered by a reservoir 72, the stabilized water then being periodically returned, by means of a network of pipes and pumps 76 intended for this use, to a second storage tank 71 within which some solid species, with a sufficient waiting time, may be separated by settling out. The periodicity depends notably on the destruction rate.

Figure 7:
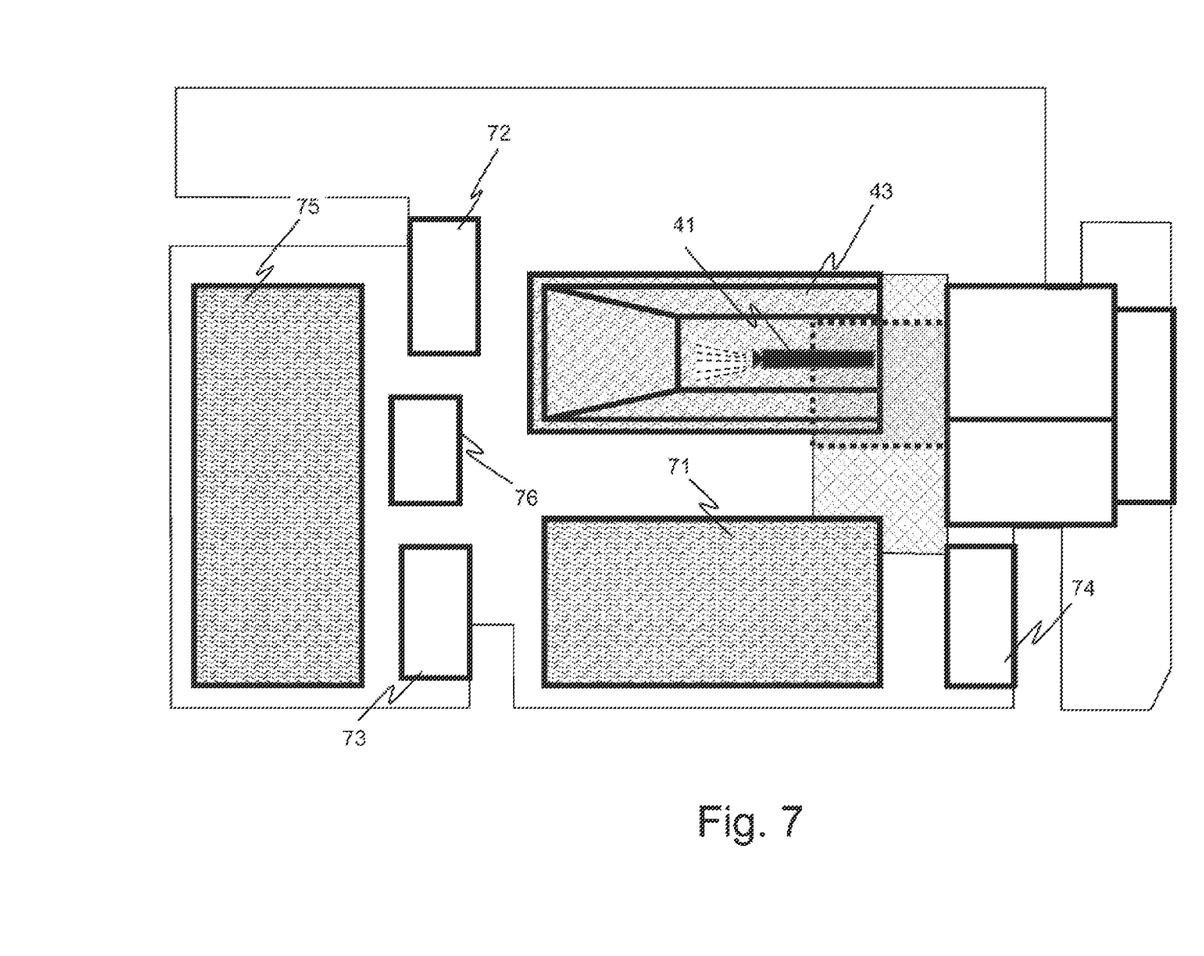
FIG. 7 shows a schematic illustration of an example of infrastructure for implementing the method according to the invention.

Following such a transfer, and in order to move on to the following dismantling sequences, a reserve of "clean" water, contained in a tank 75, is then transferred to the firing tank 43. "Clean" water is understood here to mean recycled water, that is to say water freed as far as possible of combustion products dissolved during a previous use. Thus, sequences that each consist in emptying the tank 43 into the tank 71, the tank 71 into the tank 75, and the tank 75 into the tank 43 are carried out periodically, during the execution of the various dismantling sequences. These emptying and filling sequences are thus repeated until the analyses carried out on the three tanks 43, 71 and 75 illustrate the necessity of carrying out a complete renewal (by pumping) of the water used, the complete renewal taking place, a priori, once a year. The water thus recovered is itself reprocessed by suitable plants, while "clean" water is then employed to fill the tanks 43 and 75.

an operation 63 of recovering and separating solid combustion products present at the bottom of the tanks 43 and 71, these products having accumulated, under the effect of gravity, at the bottom of the tanks during the successive dismantling sequences 31. These products are thus periodically evacuated to a buffer storage tank 73. This waste is then separated and recycled in an appropriate manner. It is subject either to operations 65 or 66 of reuse for the recyclable products, or of dumping 67 for final, non-recyclable waste.

Thus, the metal elements are, for example, recycled in a foundry for the production of new metal pieces, while the structural elements made of composite materials may, depending on their degree of toxicity, either be subjected to subsequent processing cycles that aim to recover the fibers (carbon, Kevlar) for the production of low performance composites or filled plastics materials or for the production of cement, or be treated as final waste.

It should be noted that the checking step 61 may be reduced to simply counting the number of dismantling sequences carried out, the test then consisting in determining if the number has reached a number of sequences, fixed a priori, beyond which it is considered to be necessary to implement the operations 62 and 63. Depending on the rate of the dismantling operations carried out, the operations 62 and 63 are then carried out more or less frequently, monthly for example.

Table 1 illustrates, by way of observations carried out during the dismantling and destruction of solid-propellant engines of the composite type in a tank as described above, the behavior of the various liquid and gaseous combustion products which appeared during the implementation of the method according to the invention.

TABLE 1

Example of chemical species generated during a firing in a pool for a solid propellant of the butargol 68/18 type.

| Chemical species released | | | Weight fractions present in the | Mechanisms observed |
|---|---|---|---|---|
| Abbreviation | Designation | State | combustion gases | during processing |
| CO | Carbon monoxide | Gaseous | 21.2% | No reaction in contact with the water in the tank. Rises to the surface and is evacuated in a gaseous form. |
| $CO_2$ | Carbon dioxide | Gaseous | 2.8% | Water-soluble species. The residence time leads to transformation of $CO_2$ into carbonic acid $HCO_3-$ |
| HCl | Hydrochloric acid | Gaseous | 20.2% | Very water-soluble species. Transformation into the liquid state within the tank. |
| H2 | Hydrogen | Gaseous | 2.1% | Species insoluble in water. Rises to the surface and is evacuated in a gaseous form. |
| $H_2O$ | Water | Gaseous | 9.4% | Gaseous species which condenses in the form of a liquid within the tank. |

TABLE 1-continued

Example of chemical species generated during a firing in
a pool for a solid propellant of the butargol 68/18 type.

| Chemical species released | | | Weight fractions present in the combustion gases | Mechanisms observed during processing |
|---|---|---|---|---|
| Abbreviation | Designation | State | | |
| $N_2$ | Nitrogen | Gaseous | 8.3% | Species insoluble in water. Does not recombine with atmospheric oxygen at the surface of the tank. |
| $Al_2O_3$ | Alumina | Liquid | 34% | Species condensed in the form of a solid in contact with water. Trapped by settling at the bottom of the tank. |
| $FeCl_2$ | Ferrous chloride | Liquid | 1.5% | Water-soluble species. Remains trapped in the processing tank. |

It should be noted that, as can be seen from reading table 1, some gaseous species do not undergo any transformation as they pass through the water, such that they rise to the surface and are evacuated into the atmosphere. The gaseous species that do not undergo any transformation potentially represent a danger to any operators. Furthermore, their release into the atmosphere is subject to the regulations which fix the maximum authorized weekly release threshold, these regulations being set by prefectoral orders relating to the use of the industrial site in question in which the method is implemented. For this reason, in a preferred embodiment, the method according to the invention is carried out with a tank, above which there are placed suction means (extractor hood) which make it possible to recover these gaseous species and to process them by way of a catalytic treatment.

Consequently, in this embodiment, the step 313 of starting an engine in order to empty its propellant also comprises the starting of these suction means. The suction means are started before the engine mounted on the test rig is started (or before the first engine is started if the rig accommodates a plurality of engines) and are stopped after the engine has used up all of its propellant (or after the last engine started has used up all of its propellant).

The invention claimed is:

1. A method for dismantling a solid fuel engine containing propellant, the method comprising:
   mounting the engine on a static test rig;
   immersing the engine with the static test rig directly in a tank filled with water;
   starting the engine to combust the propellant and expel combustion products into the water;
   withdrawing the engine with the static test rig from the tank after the combustion of the propellant; and
   disassembling the engine.

2. The method of claim 1, further comprising:
   rinsing the engine to extract solid combustion residues adhered to internal walls of the engine prior to the disassembling of the engine.

3. The method of claim 2, further comprising:
   testing a content of at least one of a combustion product in the water of the tank and a quantity of an insoluble combustion product located at the bottom of the tank after the withdrawing of the engine with the static test rig from the tank; and
   immersing a second engine in the water based on a satisfactory state of the water after the testing.

4. The method of claim 3, further comprising:
   recovering and screening the insoluble combustion product located at the bottom of the tank based on an unsatisfactory state of the water after the testing; and
   purifying the water in the tank.

5. The method of claim 4, further comprising recycling the insoluble combustion product recovered from the tank.

6. The method of claim 1, further comprising:
   mounting a second engine containing a second propellant on the static test rig;
   immersing the second engine with the static test rig directly in the tank filled with water;
   starting the second engine to combust the second propellant;
   removing the second engine with the static test rig from the water after the combustion of the second propellant; and
   disassembling the second engine.

7. The method of claim 6, wherein the static test rig includes a barrel-type device, and the engine and the second engine are sequentially started.

* * * * *